(12) United States Patent
Higuchi et al.

(10) Patent No.: US 7,084,387 B2
(45) Date of Patent: Aug. 1, 2006

(54) MULTIPLE-OPTICAL-AXIS PHOTOELECTRIC SWITCH, MOUNTING STRUCTURE THEREFOR, AND FIXTURE THEREFOR

(75) Inventors: Yoshihiro Higuchi, Aichi (JP); Ryousuke Nanba, Aichi (JP)

(73) Assignee: SUNX Limited, Aichi (JP)

( * ) Notice: Subject to any disclaimer, the term of this patent is extended or adjusted under 35 U.S.C. 154(b) by 0 days.

(21) Appl. No.: 10/491,167

(22) PCT Filed: Dec. 9, 2003

(86) PCT No.: PCT/JP03/15698

§ 371 (c)(1),
(2), (4) Date: Sep. 2, 2004

(87) PCT Pub. No.: WO2004/109735

PCT Pub. Date: Dec. 16, 2004

(65) Prior Publication Data

US 2005/0122590 A1 Jun. 9, 2005

(30) Foreign Application Priority Data

Jun. 6, 2003 (JP) .................................. 2003-163018

(51) Int. Cl.
*G01V 9/04* (2006.01)

(52) U.S. Cl. ...................... 250/221; 250/222.1; 250/239
(58) Field of Classification Search ................. 250/221, 250/222.1, 239, 216, 559.12; 340/555, 556, 340/557
See application file for complete search history.

(56) References Cited

U.S. PATENT DOCUMENTS

| | | | |
|---|---|---|---|
| 4,704,524 A | * 11/1987 | Masaki et al. | .............. 250/239 |
| 5,266,810 A | * 11/1993 | Murphy | ................. 250/559.24 |
| 6,140,633 A | * 10/2000 | Iwasaki et al. | ............. 250/221 |
| 6,236,036 B1 | * 5/2001 | Kudo et al. | ................. 250/221 |
| 6,239,423 B1 | * 5/2001 | Hama et al. | ................ 250/221 |
| 6,414,603 B1 | * 7/2002 | Yamaguchi et al. | ..... 340/815.4 |
| 6,784,415 B1 | * 8/2004 | Kudo et al. | ................. 250/221 |

FOREIGN PATENT DOCUMENTS

| | | |
|---|---|---|
| JP | 3-26026 | 3/1991 |
| JP | 7-18218 | 4/1995 |
| JP | 2554755 | 8/1997 |
| JP | 10-74433 | 3/1998 |
| JP | 11-329180 | 11/1999 |
| JP | 2002-42619 | 2/2002 |
| JP | 2002-158575 | 5/2002 |
| JP | 2003-123603 | 4/2003 |

* cited by examiner

*Primary Examiner*—Hung Xuan Dang
(74) *Attorney, Agent, or Firm*—Wenderoth, Lind & Ponack, L.L.P.

(57) ABSTRACT

A mounting structure for a multiple-optical-axis photoelectric switch comprising, a protrusion of a first member attached to cap members located on either end of the main case of one or both of a light receiving body and a light emitting body. The protrusion is interposed between a convex curved surface of a second member and a concave curved surface of a third member. Elongated holes in the protrusion allow the bodies to pivot about an axis containing the light emitters and light receivers. Consequently, a multiple-optical-axis photoelectric switch, mounting structure and fixture can be provided in which the optical axis can be adjusted without being influenced by the limitation in the spaces above and below the main case while the multiple-optical-axis photoelectric switch is mounted at a predetermined mounting part.

20 Claims, 11 Drawing Sheets

MULTIPLE-OPTICAL-AXIS PHOTOELECTRIC SWITCH, MOUNTING STRUCTURE THEREFOR, AND FIXTURE THEREFOR

TECHNICAL FIELD

The present invention relates to multiple-optical-axis photoelectric switch, and more particularly to a mounting structure for a main case of a light emitter or light receiver of the multiple-optical-axis photoelectric switch.

BACKGROUND ART

Multiple-optical-axis photoelectric switches comprise a light emitter having a plurality of light emitting elements aligned and a light receiver having a plurality of light receiving elements aligned and paired with the light emitting elements respectively. Typically both units are disposed opposite to each other with a predetermined detecting region interposed therebetween. When an object is present between the light emitter and receiver, light emitted by the light emitter and traveling toward the light receiver is intercepted by the object. As a result, the amount of light received by the light receiver is reduced as compared with the case where no object is present. Accordingly, an object passing through the detecting region can be detected by measuring the amount of light received by the light receiver.

Main cases for the respective light emitter and receiver in this type of multiple-optical-axis photoelectric switch are disclosed in JP-10-74433-A (hereinafter referred to as "document 1") and JP-U-2554755-B (hereinafter referred to as "document 2"). As disclosed, each main case is mounted to a mounting wall by a pair of mounting plates provided on both ends thereof and having an L-shaped cross section so as to pivot about a pivot shaft extending along the direction of alignment of the elements. Consequently, while each main case is mounted on the mounting wall, an optical axis can be adjusted so that the light emitted by each light emitter is received by the corresponding light receiver.

The mounting structure will be explained concretely with the structure of the document 1 exemplified. The aforesaid L-shaped mounting plate includes one of walls of the L-shaped mounting plate disposed opposite an end face of the main case, identified as the end face wall. The end face wall of the mounting plate is formed with an insertion hole and an arc groove having the insertion hole as its center, both extending through the end face wall. The other wall of the mounting plate is disposed opposite the mounting wall and is formed with a pair of through holes through which fixing screws are inserted to be threadingly engaged with the mounting wall. Mounting screws are inserted from an upper face of the end face wall, through the insertion hole and the groove, to be threadingly engaged with screw holes formed in the end of the main case respectively. Fixing screws are inserted through the paired insertion holes of the other wall and are threadingly engaged with screw holes of the mounting wall respectively, whereby the main case is fixed to the fixing wall. In the adjustment of optical axis, the mounting screw inserted through the groove of the end face wall is loosened such that the main case is capable of pivoting about the insertion hole. Upon completion of the optical axis adjustment, the mounting screw is retightened so that the position of the optical axis is fixed.

The multiple-optical-axis photoelectric switch is installed in various mounting places. There is sometimes a case where a sufficient space cannot be ensured above or below the main case. In this case, the loosening and tightening of the mounting screws provided on the end of the main case with a suitable tool are difficult during the optical axis adjustment of the aforesaid documents 1 and 2. As a result, there can be a case where the fixing screws are detached so that the main case is detached from the mounting wall in order to adjust the optical axis.

The present invention was made in view of the foregoing and an object thereof is to provide a multiple-optical-axis photoelectric switch in which the optical axis can be adjusted without being influenced by the limitation in the spaces above and below the main case when the multiple-optical-axis photoelectric switch is mounted at a predetermined mounting part.

SUMMARY OF THE INVENTION

To achieve the object, a mounting structure for a multiple-optical-axis photoelectric switch is described according to one aspect of the current invention. The switch includes a light emitter having a plurality of light emitting elements aligned in a row and a light receiver having a plurality of light receiving elements paired with the light emitting elements respectively and also aligned in a row. At least one of the light emitter and receiver includes a main case which is mounted at a predetermined mounting part so as to pivot about a pivot axis extending along a direction of alignment of the elements. The mounting structure is characterized by a first member provided on an end of the main case in the direction of alignment and having a protrusion extending in the direction of alignment and having an arc cross section, a second member having a convex curved surface with the same curvature as a concave curved surface of the protrusion, a third member having a concave curved surface with the same curvature as a convex curved surface of the protrusion, and a mounting screw. Wherein the protrusion of the first member is interposed between the convex curved surface of the second member and the concave curved surface of the third member. Either one of the second and third members is formed with a screw insertion hole extending therethrough from the curved surface opposed to the protrusion to an outer surface opposite the curved surface. The other of the second and third members is provided with a fixing section adapted to be fixed to the mounting part and a screw hole formed in the curved surface opposed to the protrusion so that the mounting screw, having been inserted through the screw insertion hole from the outer surface of said one member, is threadingly engaged with the screw hole. The protrusion has a guiding elongated hole located between the screw insertion hole and the screw hole and extending in the direction of the periphery of the protrusion. The elongated hole having a larger width than a diameter of the mounting screw.

Another aspect of the current invention is characterized by the following. The mounting structure for the multiple-optical-axis photoelectric switch, according to the previous aspect of the current invention, is modified so that the second member, having the convex curved surface, is formed to be recessed at a side opposite to the convex curved surface. The recess is formed so that the second member accommodates a signal cable drawn from the end of the main case.

Another aspect of the current invention is characterized by the following. The mounting structure for the multiple-optical-axis photoelectric switch, according to any of the previous aspects of the current invention, is modified so that the second member is formed with the screw insertion hole and the third member is formed with the fixing section and the screw hole. The protrusion is formed so as to have as a center thereof an axis, extending in the direction of alignment, on a front surface of the main case toward which each element is directed. The protrusion is formed so as to have an arc cross section.

A fixture for a multiple-optical-axis photoelectric switch is described according to yet another aspect of the current invention. The switch includes a light emitter having a plurality of light emitting elements aligned in a row and a light receiver having a plurality of light receiving elements paired with the light emitting elements respectively and aligned in a row. At least one of the light emitter and receiver includes a main case which is mounted at a predetermined mounting part by the mounting structure as defined in any one of the preceding aspects of the current invention. The fixture being used to mount said main case provided with the first member at the predetermined mounting part so that said main case is capable of pivoting about a pivot axis extending along a direction of alignment of the elements. The fixture is characterized in that the fixture is provided with the second and third members and the mounting screw.

A fixture for a multiple-optical-axis photoelectric switch is described according to still another aspect of the current invention. The switch includes a light emitter having a plurality of light emitting elements aligned in a row and a light receiver having a plurality of light receiving elements paired with the light emitting elements respectively and aligned in a row. At least one of the light emitter and receiver includes a main case which is mounted at a predetermined mounting part by the mounting structure as defined in any one of the first three aspects of the current invention. The fixture is used to mount said main case at the predetermined mounting part so that said main case is capable of pivoting about a pivot axis extending along a direction of alignment of the elements. The fixture is characterized in that the fixture is provided with the first, second, and third members, and the mounting screw.

A multiple-optical-axis photoelectric switch is described according to yet still another aspect of the current invention. The switch includes a light emitter having a plurality of light emitting elements aligned in a row and a light receiver having a plurality of light receiving elements paired with the light emitting elements respectively and aligned in a row. At least one of the light emitter and receiver includes a main case which is mounted at a predetermined mounting part by the mounting structure as defined in any one of the first three aspects of the current invention. The switch is characterized by a fixture provided thereon. The first member is provided at the main case side and the fixture is provided with the second and third members and the mounting screw.

A multiple-optical-axis photoelectric switch according to a further aspect of the current invention is described as follows. The switch includes a light emitter having a plurality of light emitting elements aligned in a row and a light receiver having a plurality of light receiving elements paired with the light emitting elements respectively and aligned in a row. At least one of the light emitter and receiver includes a main case which is mounted at a predetermined mounting part by the mounting structure as defined in any one of the first three aspects of the current invention. The switch is characterized by a fixture provided thereon. The fixture is provided with the first, second, and third members, and the mounting screw.

According to the mounting structure of the first aspect of the current invention, the protrusion of the first member provided on the end of the main case is interposed between the convex curved surface of the second member and the concave curved surface of the third member. The first aspect of the current invention includes, for example, the following constructions (a) and (b):

(a) The construction in which the second member is formed with the screw insertion hole and the third member is formed with the fixing section (the second member is "one member" and the third member is "the other member").

In this construction, the mounting screw, having been inserted through the screw insertion hole formed in the second member and the guiding elongated hole of the protrusion, is threadingly engaged with the screw hole formed in the concave curved surface of the third member. The fixing portion of the third member is secured to the mounting part.

(b) The construction in which the second member is formed with the fixing portion and the screw hole, and the third member is formed with the screw insertion hole (the second member is "the other member" and the third member is "one member").

In this construction, the mounting screw, having been inserted through the screw insertion hole formed in the third member and the guiding elongated hole of the protrusion, is threadingly engaged with the screw hole formed in the convex curved surface of the second member. The fixing portion of the second member is secured to the mounting part.

Consequently, the main case can be mounted on the mounting part. When the adjustment of the optical axis is required, the mounting screw, inserted through the screw insertion hole and the guiding elongated hole, is loosened. The mounting screw is in threading engagement with an outer surface of the second member directed sideways (perpendicular) relative to the direction of alignment of the elements (the surface opposed the convex curved surface) in the construction (a). In the construction (b), the mounting screw is in threading engagement with an outer surface of the third member directed sideways (perpendicular) relative to the direction of alignment of the elements (the surface opposed the concave curved surface).

According to the construction, a predetermined tool is applied to the mounting screw at the side of the main case in order for the mounting screw to be loosened or tightened for the optical axis adjustment. Accordingly, even when the space defined above or below the main case is narrow, the mounting screw can be loosened or tightened for the optical axis adjustment while the main case is mounted on the mounting part.

Further, there is the construction in which a signal cable is drawn out from the end of the main case. According to the mounting structure of the second aspect of the current invention, the second member is formed so as to be recessed (for example, with a groove) at the outer surface side (the surface opposed to the convex curved surface) so that the second member bypasses the signal cable. Accordingly, when the main case is caused to pivot, an outer periphery of the signal cable can be prevented as much as possible from being damaged by, for example, sliding contact of the second member.

Further, according to the mounting structure of the third aspect of the current invention, in the construction (a), the protrusion is formed so as to have as a center thereof an axis, extending in the direction of alignment, on a front surface of the main case toward which each element is directed. The protrusion is formed so as to have an arc cross section. More specifically, the main case pivots about a line on the front surface thereof (a light emitting surface of the light emitter and a light receiving surface of the light receiver). Accordingly, in the case of the light emitter, only the light-emitting direction (the direction of the optical axis) can be changed without changing the location of light emission from each light emitting element. In the case of the light receiver, only the light-receiving direction (the direction of the optical axis) can be changed without changing the location where each light receiving element can receive light. Accordingly, the optical axis can easily be adjusted even when the light emitted by the light emitter has a relatively small width or even when the light-receiving area at the light receiver side is narrow.

Although differing from the construction of the present invention, another construction can be considered which comprises a pivot shaft protruding from an end of a cap fitted onto an open end of the main case. A first member is fixed to the mounting part and a second member has a groove covering an outer periphery of the pivot shaft from one side. The first and second members are secured to each other at side portions of the grooves by a mounting screw inserted through the outer surface of the first member. This construction can achieve substantially the same effects as achieved by the above-described present invention.

However, when the signal cable is drawn out of the lengthwise end of the main case in the construction provided with a pivot shaft, it should be considered that the signal cable is drawn out through the cylindrically shaped pivot shaft. Accordingly, when the aforesaid cap member is attached to the open end of the main case, the signal cable is first inserted through the pivot shaft of the cap member. At this point the assembly work of the multiple-optical-axis photoelectric switch becomes troublesome. A connector having a larger diameter than the cable wire is usually provided on a distal end of the signal cable. In order that the connector may be insertable, the size of the pivot shaft must be increased. Subsequently the whole fixture is rendered large in size and accordingly, this is not a desirable construction.

On the other hand, the mounting structure of the present invention does not surround the whole periphery of the signal cable. Accordingly, the first to third members can be assembled to one side of the signal cable (the right-and-left direction perpendicularly across the axis of the cable) with the signal cable being a center. Consequently, the assembly work is relatively easy and further; the fixture need not be rendered large in size in order to accommodate the diameter of the connector at the distal end of the signal cable.

BEST MODE FOR CARRYING OUT THE INVENTION

<First Representative Embodiment>

A first representative embodiment of the present invention will be described with reference to FIGS. 1 to 8.

1. Outline of Multiple-optical-axis Photoelectric Switch

Figure 1:
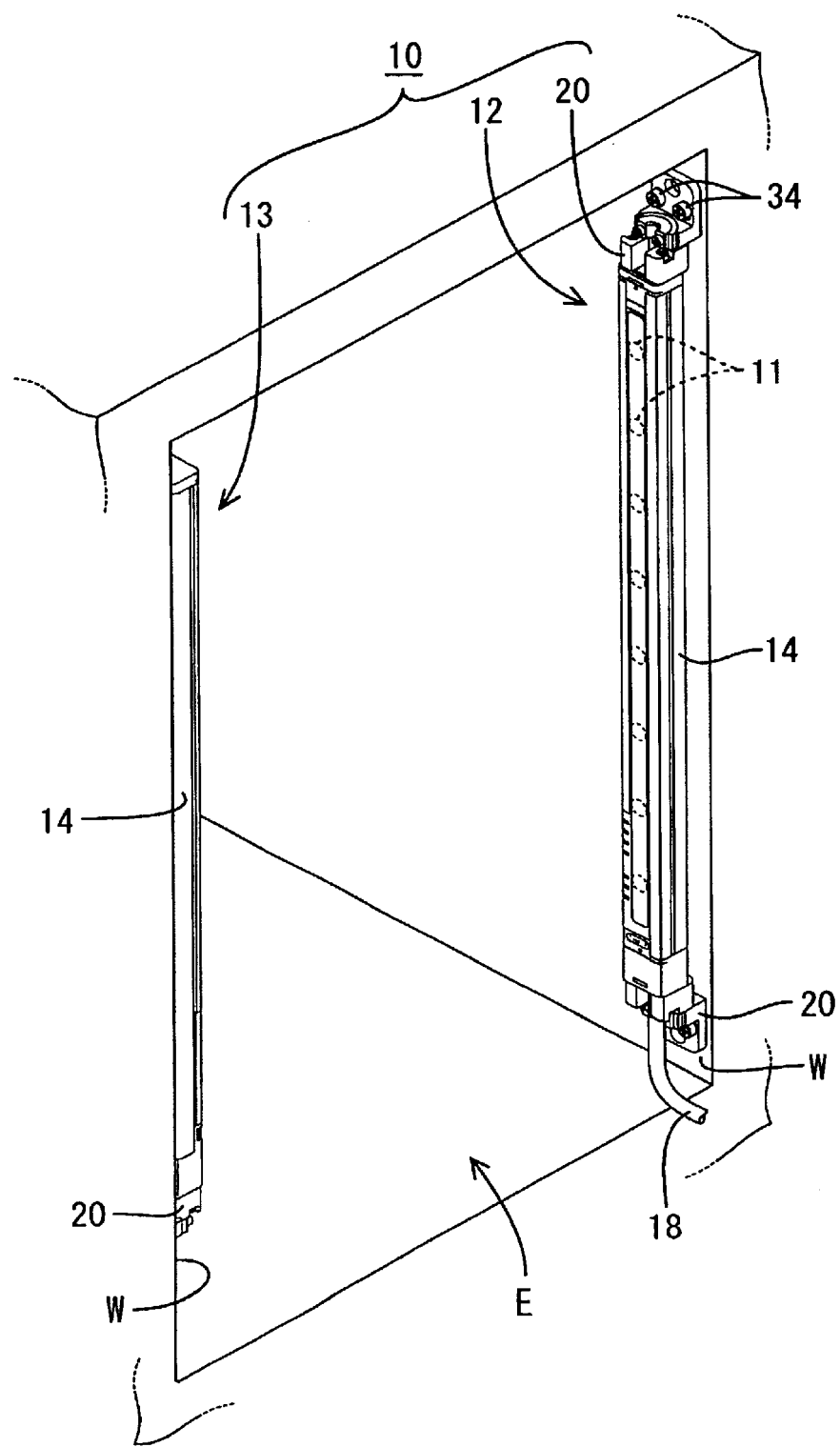
FIG. 1 is a perspective view of the multiple-optical-axis photoelectric switch in accordance with a first representative embodiment of the present invention in a mounted state.

The multiple-optical-axis photoelectric switch 10 of the embodiment includes a light emitter 12 having a plurality of light emitting elements 11 aligned in a row and a light receiver 13 having a plurality of light receiving elements (not shown) paired with the light emitting elements 11 respectively and aligned in a row. The units are disposed opposite to each other with a predetermined detecting region being defined therebetween, as shown in FIG. 1. When an object is present between the light emitter 12 and light receiver 13, the light emitted by the light emitter 12 and traveling toward the light receiver 13 is intercepted (blocked) by the object. As a result, the amount of light received by the light receiver 13 is reduced as compared with the case where no object is present. Accordingly, an object passing through the detecting region can be detected by measuring the amount of light received by the light receiver 13. Main cases 14 of the light emitter 12 and light receiver 13, are mounted by fixtures 20, having a structure which will be described later, on a pair of opposed walls W at a detecting part E with a rectangular opening (corresponding to "a predetermined mounting part"). The main cases 14 pivot about a pivot axis extending along the direction of alignment of the elements 11 (vertically as viewed in FIG. 1).

These structures will be described in detail with the light emitter 12 side being exemplified. In the following description, the direction in which the elements of the light emitter 12 and light receiver 13 are directed will be referred to as a frontward direction, whereas the opposed wall W side will be referred to as a rear.

Figure 2:
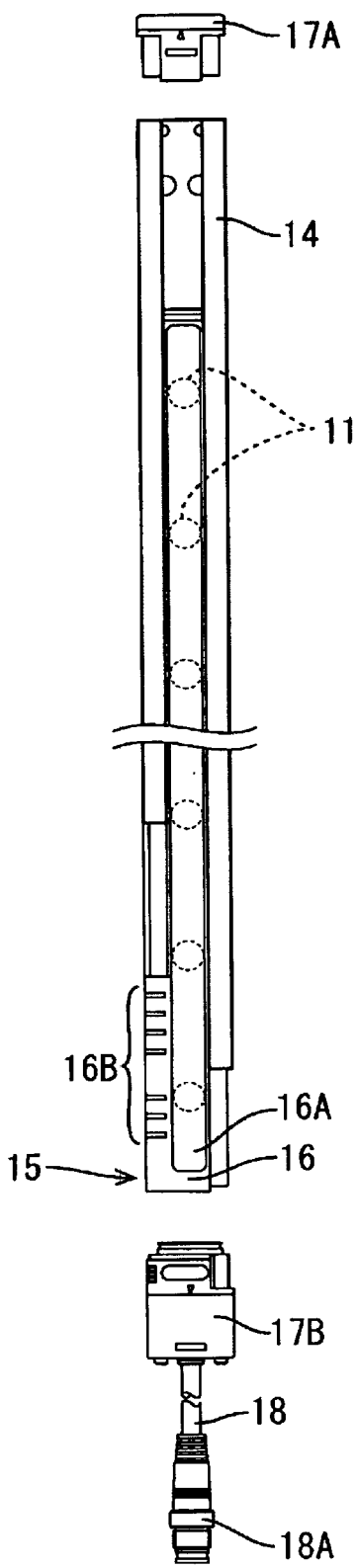
FIG. 2 is an exploded view of the light emitter.

2. Concrete Construction (1) Light Emitter:

The light emitter 12 comprises a light emitting unit 15 enclosing, for example, eight light emitting elements 11 aligned in a row. Light emitter 12 also comprises a main case 14, which has a generally C-shaped cross section and in which the light emitting unit 15 is housed, as shown in FIG. 2. More specifically, the light emitting unit 15 includes a housing case 16. Housing case 16 is formed with a cylindrical light-emitting window 16A containing an opening which is formed in one side thereof and closed by a light-transmitting member. The eight light emitting elements 11 are housed in the housing case 16 so as to be aligned in a row corresponding with the light-emitting window 16A. Furthermore, a pair of box-shaped cap members, 17A and 17B, are respectively fitted in the open ends of the main case 14. In the embodiment, one cap member 17B (attached to the lower side in FIGS. 1 and 2) has a proximal end electrically connected to the inner circuit of the light emitting unit 15 at the side of light emitting unit 15 directly opposed to the side of 17B to which the main case 14 is attached. The cap member 17B further has a distal end from which a signal cable 18, to which a connector 18A is attached, is drawn out. A plurality of display lamps 16B are juxtaposed on the lower end of the light emitting unit 15. The display lamps 16B include an optical axis alignment display lamp, actuated according to the optical axis alignment, an operation display lamp, actuated according to the control of the light emission, a failure display lamp, and the like.

(2) Mounting Structure of Fixture:

The fixture 20 has a structure corresponding to structure (a) described previously in the Summary section of the present invention. More specifically, the fixture 20 includes a first member 22 having a protrusion 21 with an arc cross section, a second member 25 formed with screw insertion holes, a third member 30 formed with a fixing section and screw holes, and a pair of mounting screws 35.

(A) First Member:

The first member 22 is attached to the side of the cap member 17A (17B) opposite to the main case 14. The first member 22 includes a U-shaped portion 23 which has a substantially U-shaped cross section and partially surrounds the outer peripheral surface of the signal cable 18 drawn from the cap member attached to the side of first member 22. First member 22 also has a protrusion 21 which extends along the end surface opposite to the side of the U-shaped portion 23 attached to the cap member 17A (17B), and also partially surrounds the signal cable 18. The U-shaped portion 23 has a pair of through holes 23A extending through both upper ends of the U in the direction of alignment. A pair of screws 24 are inserted through the holes 23A to be threadingly engaged with a pair of screw holes 19A, formed in cap members 17A and 17B, whereby the U-shaped portion 23 is secured to the cap member 17A (17B). Three sets of protruding and recessed portions, 19B and 23B (see FIGS. 4(A) to 4(D)), are formed in opposed sides of the cap member 17A (17B) and the U-shaped portion 23, so that the first member 22 is positioned and fixed to the cap members 17A and 17B.

The aforesaid protrusion 21 is formed so as to have an arc cross section with the signal cable 18 attached to the cap member 17A (17B) serving as the center thereof (corresponding to "a pivot axis" in the present invention). See FIGS. 8(A) and 8(B). The protrusion 21 further has a pair of guiding elongated holes 21A, each of which has a larger width than the diameter of the mounting screws 35. The guiding elongated holes 21A extend circumferentially with respect to the protrusion 21. The first member 22 is not required to have a U-shaped cross section for the fixture 20 attached to the cap member 17A side from which no signal cable 18 is drawn out (the cap member at the upper end side of the light emitter 12 in FIGS. 1 and 2). The first member 22 may be constructed so that the protrusion 21 extends from one end surface side of a box-shaped member.

Figure 5A:
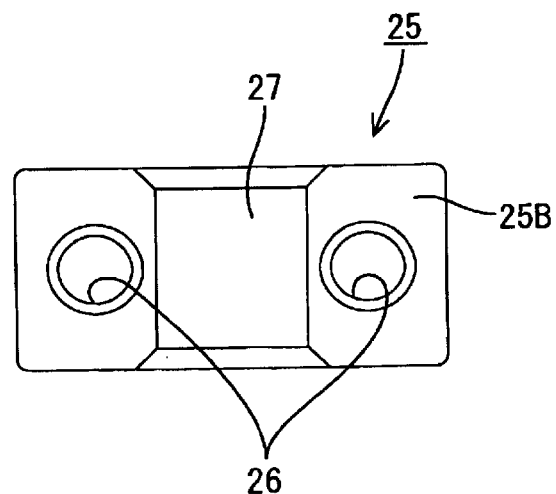
FIGS. 5(A) and 5(B) are a top view and side view of the second member.
Figure 5B:
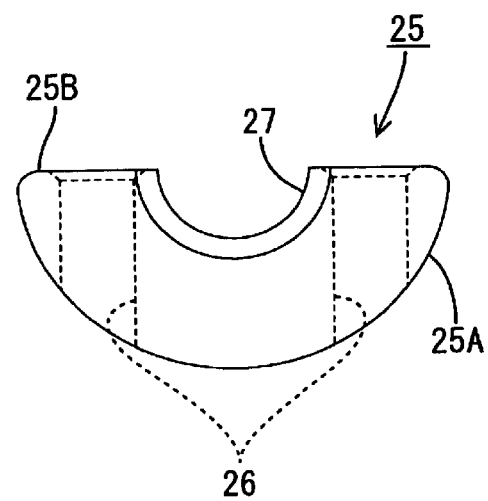

(B) Second Member:

The second member 25 is disposed at the inner curved surface 21B (corresponding to "a concave curved surface of the protrusion", the front side) of the protrusion 21 of the first member 22. The second member 25 is formed so as to have a substantially semicircular cross section and has an outer curved surface constituting "a convex curved surface" in the invention (hereinafter, referred to as "convex curved surface 25A"), as shown in FIGS. 5(A) and 5(B). The convex curved surface 25A has substantially the same curvature as the inner curved surface 21B of the protrusion 21. Further, the second member 25 has a pair of screw insertion holes 26 which are formed in both ends of the flat surface 25B, opposite to the convex curved surface 25A, so as to extend in parallel to each other through the convex curved surface 25A. The second member 25 may further have a groove 27 which is formed in a portion thereof between the screw insertion holes 26 on the flat surface 25B. The groove 27 may be recessed to have a curved surface parallel to the convex curved surface 25A. The signal cable 18 can extend through the groove 27. The fixture 20 attached to the cap member 17A (the cap member at the upper end side of the light emitter 12 in FIGS. 1 and 2), from which the signal cable 18 is not drawn, may be formed with no groove 27.

Figure 6A:
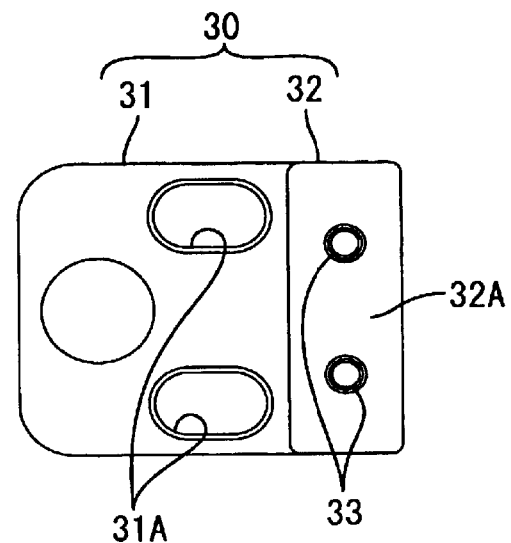
FIGS. 6(A) to 6(C) are a top view, side view and front view of the third member.
Figure 6B:
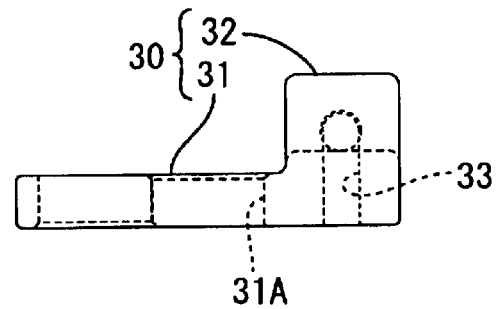
Figure 6C:
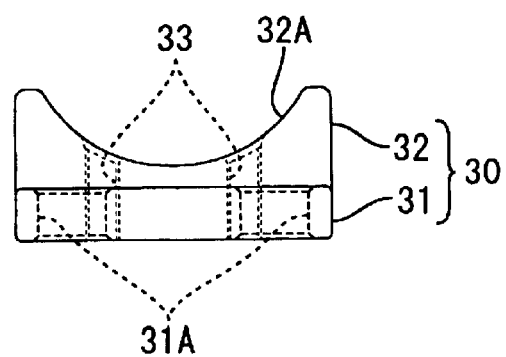

(C) Third Member:

The third member 30 (see FIGS. 6(A) to 6(C)) is disposed on a protruding outer curved surface 21C (corresponding to "a convex curved surface of the protrusion", the rear side) of the protrusion 21 of the first member 22 and fixed to opposed wall W. More specifically, the third member 30 has a rectangular flat portion 31 mounted on opposed wall W and a upright wall rising from one edge of the flat portion 31. Both walls of third member 30 are formed integrally with each other and result in a substantially L-shaped cross section. The upper side of the upright wall serves as a concave curved surface 32A, recessed into the general shape of a suspension bridge. The curved surface 32A has the same curvature as the outer curved surface 21C of the protrusion 21. The concave curved surface 32A has a pair of screw holes 33 which are formed so as to be directly opposed to the pair of screw holes 26 of the second member 25. The mounting screws 35 are threadingly engaged with the screw holes 33.

The flat portion 31 is formed with a pair of through holes 31A. A pair of fixing screws 34 (see FIG. 1) are inserted through the holes 31A to be threadingly engaged with screw holes (not shown) formed in the opposed wall W, whereby the third member 30 is secured to the opposed wall W. The aforesaid pair of through holes 31A are formed into elongated slots extending lengthwise with respect to the light emitter 12 (vertically as shown in FIG. 1), whereupon the third member 30 can be mounted on the opposed wall W and be finely adjusted vertically.

Figure 3:
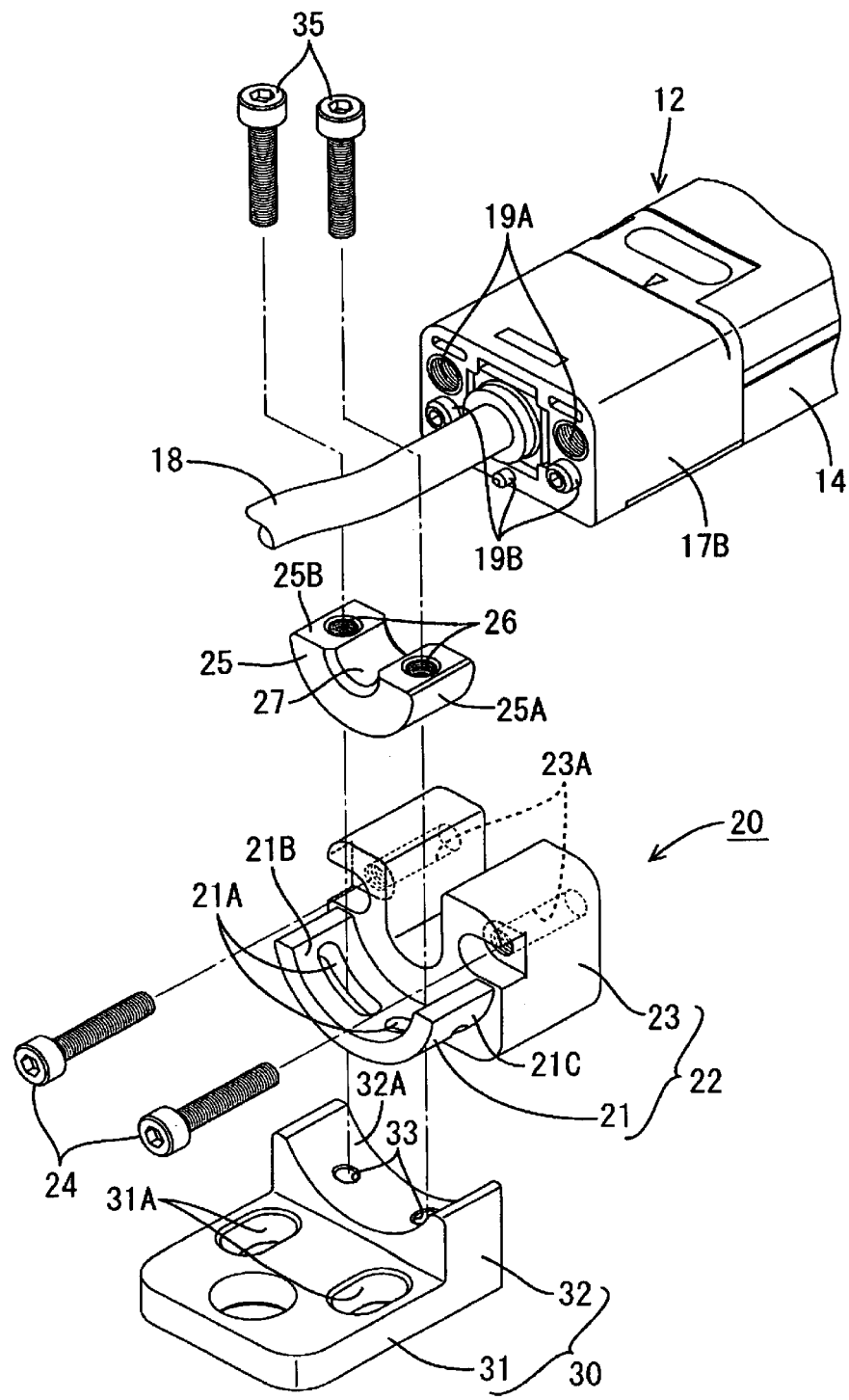
FIG. 3 is an exploded perspective view of the fixture.
Figure 4A:
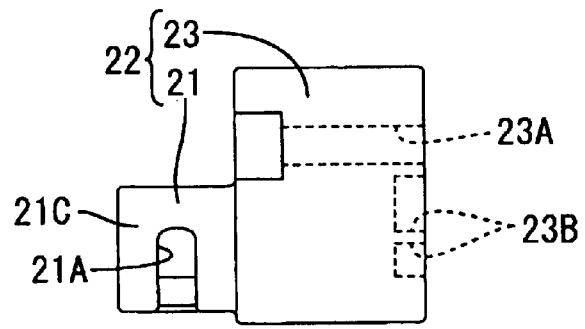
FIGS. 4(A) to 4(D) are a side view, top view, front view and rear view of the first member.
Figure 4B:
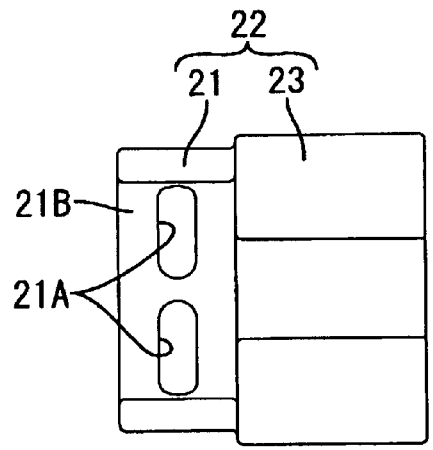
Figure 4C:
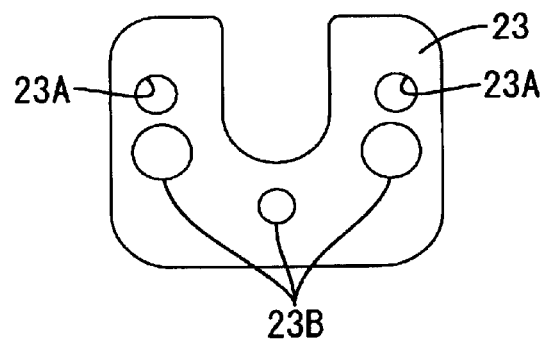
Figure 4D:
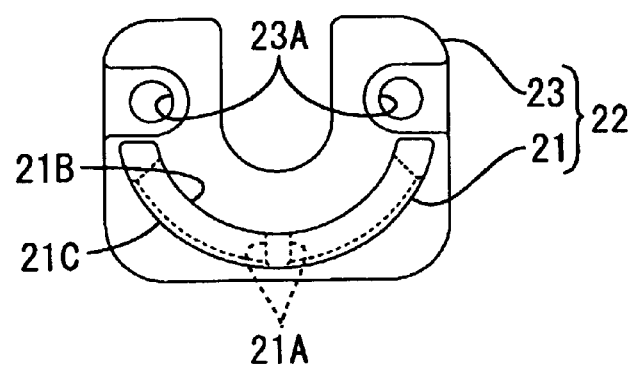
Figure 7:
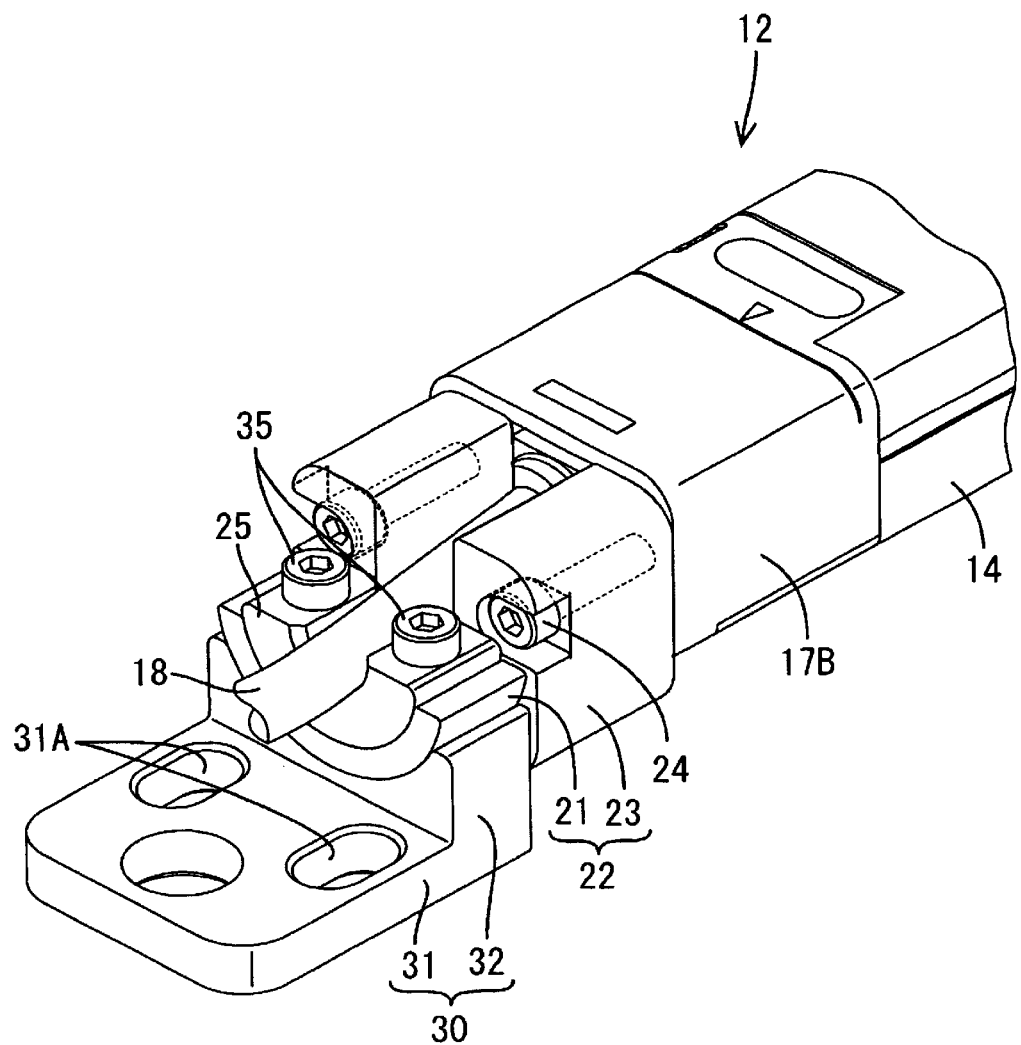
FIG. 7 is a perspective view showing the assembled state of the fixture.

In the above-described construction, the first member 22 is attached to the cap members 17A and 17B by the pair of screws 24, and the second member 25 is disposed between the signal cable 18 and the inner curved surface 21B of the protrusion 21, as shown in FIG. 3 and FIG. 7. Further, the concave curved surface 32A of the third member 30 is in contact with the outer curved surface 21C of the protrusion 21 from the rear. Subsequently, the mounting screws 35 are inserted through the screw insertion holes 26 of the second member 25 and the elongated holes 21A of the protrusion 21 and then threadingly engaged with the screw holes 33. Whereby the protrusion 21 is held between the second member 25 and the third member 30 so as to be fixed in position. The third member 30 is then mounted on the opposed wall W so that the light emitter 12 is correspondingly mounted on the opposed wall W.

When the direction of light (light axis) emitted from the light emitting elements 11 of the light emitter 12 mounted on the opposed wall W is to be adjusted, the mounting screws 35, mounted on the flat portion 25B of the frontwards directed second member 25, are loosened using a predetermined tool, so that the light emitter 12 can pivot about the signal cable 18 by an angle limited by the length of the elongated holes 21A of the protrusion 21. When an angle is reached such that light emitted from each light emitting element 11 is received by the light receiving element 13 paired with each respective light emitting element 11, the mounting screws 35 are re-tightened so that the light emitter 12 is fixed in position.

The light receiver 13 has the same structure as the foregoing light emitter 12 and may be mounted on the opposite opposed wall W so as to pivot. Whereupon the light emitter 12 and the light receiver 13 can pivot so that the optical axis of each light emitting element 11 corresponds with the optical axis of each light receiving element of the light receiver 13. Consequently, the direction of the optical axis can be readily adjusted.

3. Effect of the Embodiment

Figure 8A:
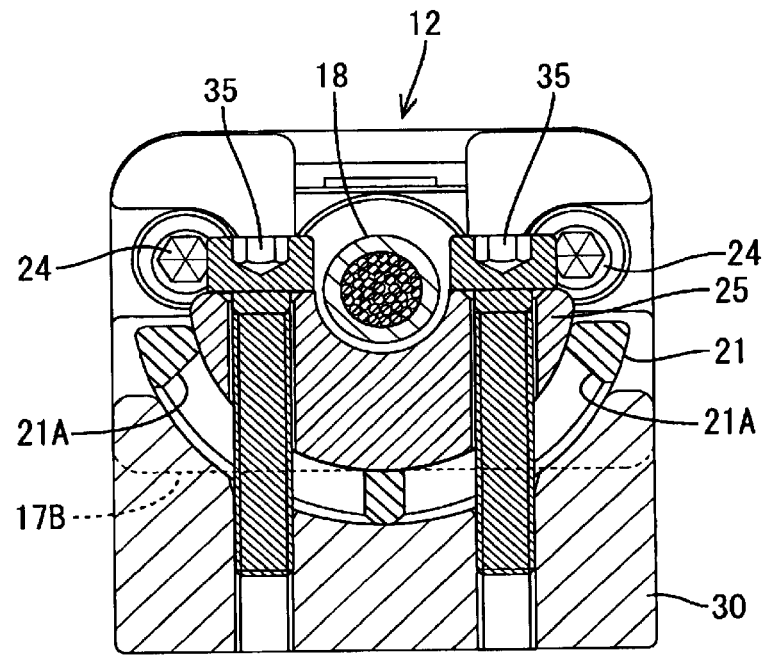
FIGS. 8(A) and 8(B) are partially sectional views showing a non-pivoted state of the main case.
Figure 8B:
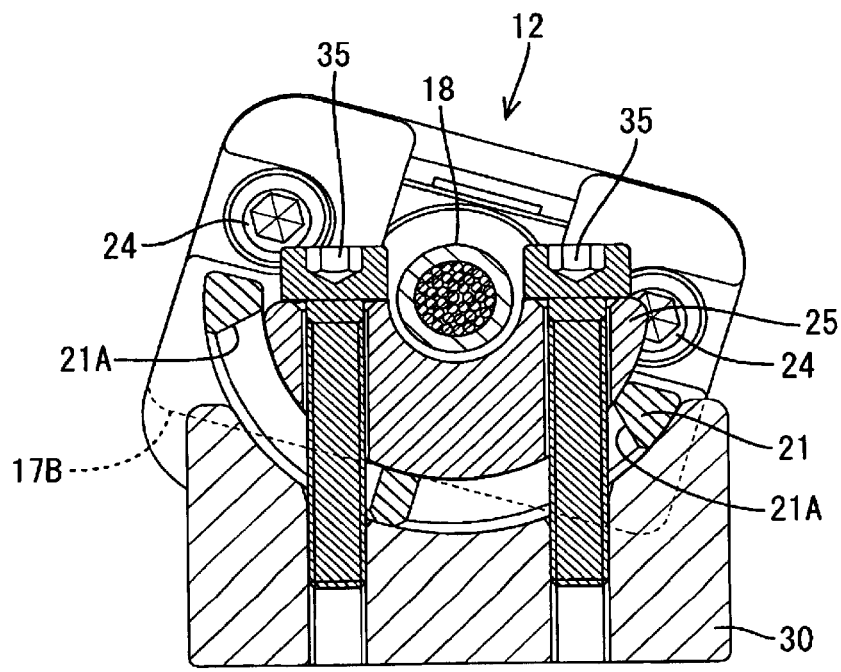

According to the mounting structure of the embodiment, the pair of mounting screws 35, mounted on the flat surface of the frontwards directed second member 25, are loosened using the predetermined tool, so that the light emitter 12 or the light receiver 13 is allowed to pivot for the adjustment of the optical axis (as seen in FIGS. 8(A) and 8(B). Accordingly, even when the spaces defined above and below the light emitter 12 and the light receiver 13 are narrow, the mounting screws 35 can be loosened and tightened for the adjustment of the optical axis while the light emitter and light receiver remain mounted on the opposed walls W.

Further, since the second member 25 may be formed with a groove so as to bypass the signal cable 18, the outer periphery of the signal cable 18 can be prevented as much as possible from being damaged by, for example, sliding contact of the second member 25 when the main case 14 is pivoted.

<Second Representative Embodiment>

Figure 9A:
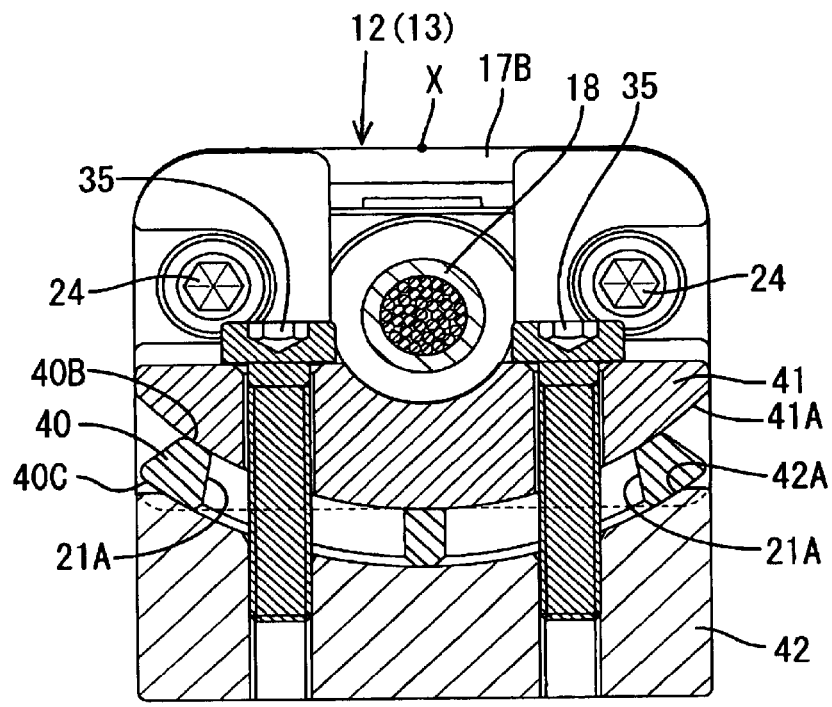
FIGS. 9(A) and 9(B) are partially sectional views showing a non-pivoted state of the main case in a second representative embodiment.
Figure 9B:
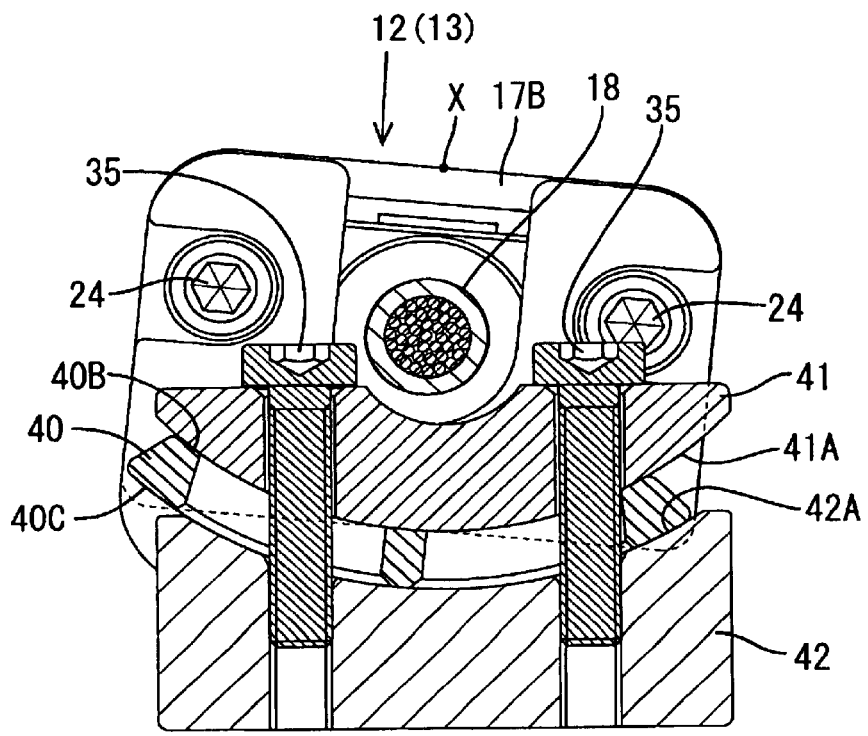

FIGS. 9(A) and 9(B) illustrate a second representative embodiment (corresponding to the invention of previously described embodiment 3). The second representative embodiment differs from the previous embodiment in the protrusion of the first member and the curvature of the convex and concave curved surfaces of the second and third members. The second representative embodiment is the same as the first representative embodiment in most other respects. Accordingly, the identical or similar parts are labeled in the second representative embodiment by the same reference symbols as those in the first representative embodiment. Repeated descriptions are eliminated and only the differences will be described.

As shown in FIG. 9(A), the protrusion 40 is formed so as to have an arc cross section with an axis X serving as the center thereof. The axis X extends in the direction of alignment of the light emitting elements 11 and the like, along the front surface of the light emitter 12 formed with the light emitting window 16A. The convex curved surface 41A of the second member 41 has the same general curvature as the inner curved surface 40B (corresponding to "a concave curved surface" in the invention) of the protrusion 40. The concave curved surface 42A of the third member 42 has the same general curvature as the outer curved surface 40C (corresponding to "a convex curved surface of the protrusion" in the invention) of the protrusion 40.

Accordingly, the main case 14 pivots about the axis X located on the front surface (also the front surface formed with the light receiving window in the light receiver 13) of the light emitter 12 formed with the light emitting window 16A, as shown in FIG. 9(B). Accordingly, in the case of the light emitter 12, only the light-emitting direction (the direction of optical axis) can be changed without changing the location of the light emission from each light emitting element 11 relative to the light emitting window 16A. In the case of the light receiver 13, only the light-receiving direction (the direction of optical axis) can be changed without changing the location where each light receiving element can receive light (relative to the light receiving window). Accordingly, the optical axis can easily be adjusted even when the light emitted by the light emitter 12 has a small width or even when the light-receiving area at the light receiver 13 side is narrow.

<Other Representative Embodiments>

The invention should not be limited by the foregoing representative embodiments. For example, the representative embodiments which will be described as follows are contained within the technical scope of the invention. Further, the invention may be modified without departing from the subject matter of the invention in ways other than the following.

Figure 10A:
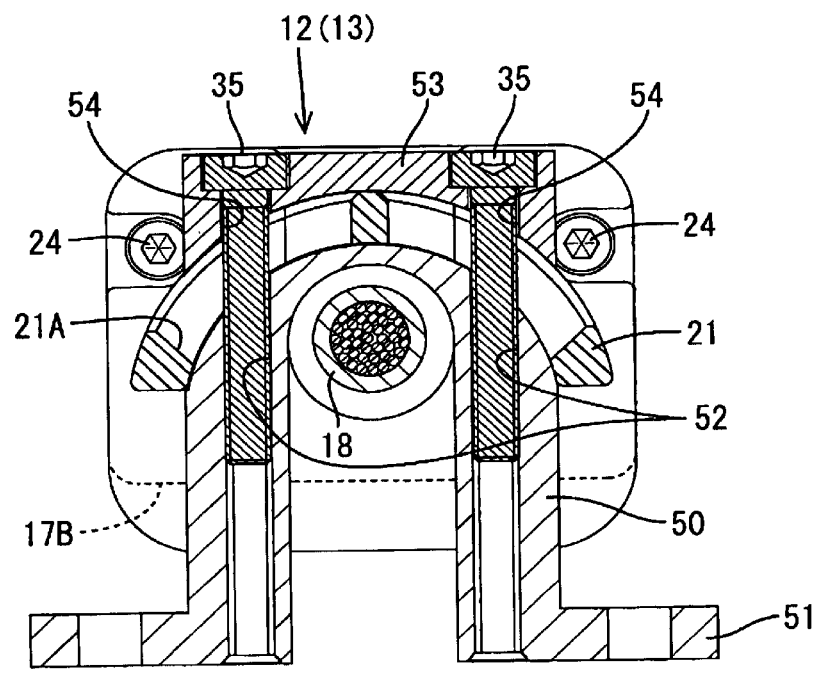
FIGS. 10(A) and 10(B) are partially sectional views showing a non-pivoted state of the main case in a modified form.
Figure 10B:
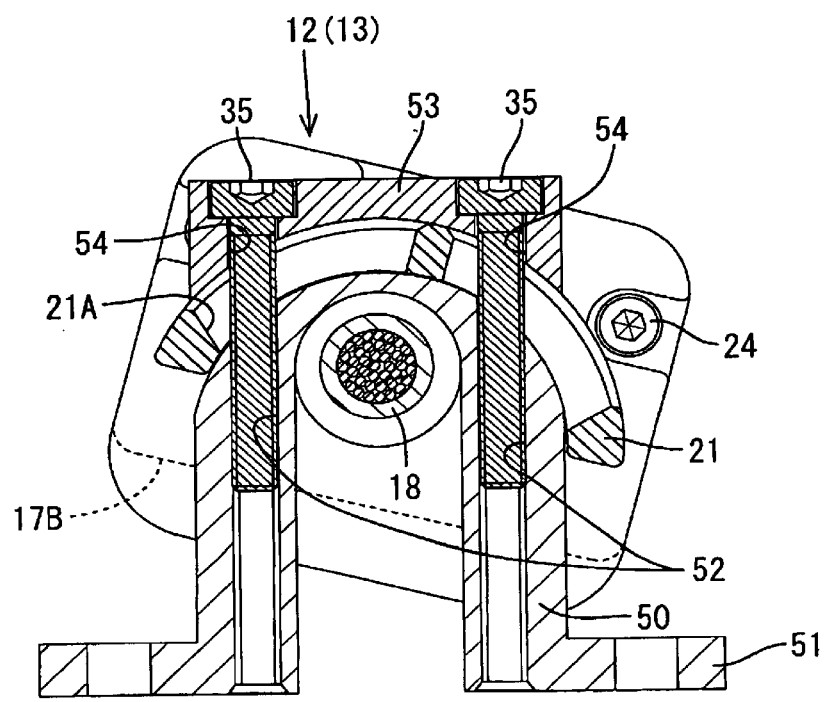

(1) The construction corresponding to the construction (a) in the Summary section of the invention is employed in the foregoing embodiments. However, the construction corresponding to the construction (b) may be employed, instead. FIGS. 10(A) and 10(B) illustrates a concrete construction. The second member 50 is formed with a fixing section 51 and screw holes 52, and the third member 53 is provided with screw insertion holes 54. This construction can achieve the same effect as was achieved from the foregoing first representative embodiment.

(2) In the foregoing representative embodiments, the guiding elongated holes formed in the protrusion 21 may instead be notches formed by cutting the end of protrusion 21. A pair of mounting screws may be inserted through the notches for example.

(3) Two mounting screws are provided in the foregoing representative embodiments. One, three, or more, mounting screws may be provided instead.

(4) The first and second representative embodiments and the modified form as shown in FIGS. 10(A) and 10(B), are all applicable to the photo receiver 13 side and accordingly, the same effect can be achieved.

(5) The protrusions 21 and 40 are provided on the first member 22, discrete from the light emitter 12 and the light receiver 13 (the cap members 17A and 17B) in the foregoing representative embodiments. However, the protrusions may be provided directly on components of the light emitter 12 and the light receiver 13 (for example, the cap members 17A and 17B) respectively (corresponding to the construction of the previously described fourth and sixth embodiments). In this case, the cap members may serve as the first members.

INDUSTRIAL APPLICABILITY

The multiple-optical-axis photoelectric switch, mounting structure, and fixture, can be provided so that the optical axis can be adjusted without being influenced by the limitation in the spaces above and below the main case while the multiple-optical-axis photoelectric switch is mounted at a predetermined mounting part.

What is claimed is:

1. A mounting structure for a multiple-optical-axis photoelectric switch including a light emitter having a plurality of light emitting elements aligned in a row and a light receiver having a plurality of light receiving elements corresponding to the light emitting elements and aligned in a row, at least one of the light emitter and the light receiver including a main case, the mounting structure adapted to fix the case to a predetermined mounting part so as to allow the case to pivot about a pivot axis extending along a direction of alignment of the elements, the mounting structure comprising:

a first member attached to a longitudinal end of the main case and having a protrusion extending in the direction of alignment and having an arc cross section comprising
    a concave surface; and
    a convex surface;

a second member; and a third member; and a mounting device, wherein the protrusion of the first member is interposed between the second member and the third member;

wherein one of the second member and the third member has a concave surface to slidingly interface with the convex surface of the protrusion of the first member; and wherein the other of the second member and the third member has a convex surface to slidingly interface with the concave surface of the protrusion of the first member; and wherein one of the second member and third member is formed with at least one screw insertion hole extending therethrough; and wherein the other of the second member and the third member is formed with a fixing section adapted to be fixed to the mounting part and at least one screw hole adapted to be threadingly engaged with the mounting device; and wherein the protrusion of the first member can be fixed in position by tightening the mounting device; and wherein the mounting device is operated generally perpendicular to the pivot axis.

2. The mounting structure for the multiple-optical-axis photoelectric switch according to claim 1, wherein the protrusion of the first member further comprises:

at least one guiding elongated hole adapted to slidingly interface with the mounting device.

3. The mounting structure for the multiple-optical-axis photoelectric switch according to claim 1, wherein the protrusion of the first member further comprises:

at least one notch adapted to slidingly interface with the mounting device.

4. The mounting structure for the multiple-optical-axis photoelectric switch according to claim 1, further comprising:

a recess formed in one of the second member and the third member and adapted to accommodate a signal cable drawn from the end of the main case.

5. The mounting structure for the multiple-optical-axis photoelectric switch according to claim 1, wherein:

the second member is formed comprising the at least one screw insertion hole; and the third member is formed comprising
the fixing section; and
the at least one screw hole; and the protrusion is formed so as to have as a center thereof an axis extending in the direction of alignment on a front surface of the main case toward which each element is directed.

6. A mounting structure for a multiple-optical-axis photoelectric switch according to claim 1, wherein:

the mounting device is a mounting screw.

7. A fixture for a multiple-optical-axis photoelectric switch including a light emitter having a plurality of light emitting elements aligned in a row and a light receiver having a plurality of light receiving elements corresponding to the light emitting elements and aligned in a row, at least one of the light emitter and the light receiver including a main case with a first member attached to a longitudinal end of the main case and having a protrusion extending in the direction of alignment comprising an arc cross section, a concave surface, and a convex surface; the fixture adapted to fix the multiple-optical-axis photoelectric switch to a predetermined mounting part so that the multiple-optical-axis photoelectric switch is capable of pivoting about a pivot axis extending along a direction of alignment of the elements, the fixture comprising:

a second member; and a third member; and a mounting device;

wherein the protrusion of the first member is interposed between the second member and the third member;

wherein one of the second member and the third member has a concave surface to slidingly interface with the convex surface of the protrusion of the first member; and wherein the other of the second member and the third member has a convex surface to slidingly interface with the concave surface of the protrusion of the first member; and wherein one of the second member and third member is formed with at least one screw insertion hole extending therethrough; and wherein the other of the second member and the third member is formed with a fixing section adapted to be fixed to the mounting part and at least one screw hole adapted to be threadingly engaged with the mounting device; and wherein the protrusion of the first member can be fixed in position by tightening the mounting device; and wherein the mounting device is operated generally perpendicular to the pivot axis.

8. The fixture for the multiple-optical-axis photoelectric switch according to claim 7, wherein the protrusion of the first member further comprises:

at least one guiding elongated hole adapted to slidingly interface with the mounting device.

9. The fixture for the multiple-optical-axis photoelectric switch according to claim 7, wherein the protrusion of the first member further comprises:

at least one notch adapted to slidingly interface with the mounting device.

10. The fixture for the multiple-optical-axis photoelectric switch according to claim 7, further comprising:

a recess formed in one of the second member and the third member and adapted to accommodate a signal cable drawn from the end of the main case.

11. The fixture for the multiple-optical-axis photoelectric switch according to claim 7, wherein:

the second member is formed comprising the at least one screw insertion hole; and the third member is formed comprising:
the fixing section; and
the at least one screw hole; and the protrusion is formed so as to have as a center thereof an axis extending in the direction of alignment on a front surface of the main case toward which each element is directed.

12. A fixture for a multiple-optical-axis photoelectric switch according to claim 7, wherein:

the mounting device is a mounting screw.

13. A fixture for a multiple-optical-axis photoelectric switch including a light emitter having a plurality of light emitting elements aligned in a row and a light receiver having a plurality of light receiving elements corresponding to the light emitting elements and aligned in a row, at least one of the light emitter and the light receiver including a main case, the fixture adapted to fix the multiple-optical-axis photoelectric switch to a predetermined mounting part so that the multiple-optical-axis photoelectric switch is capable of pivoting about a pivot axis extending along a direction of alignment of the elements, the fixture comprising:
- a first member adapted to be fixed to a longitudinal end of the main case and having a protrusion extending in the direction of alignment comprising,
  - an arc cross section, and
  - a concave surface, and
  - a convex surface;
- a second member; and
- a third member; and
- a mounting device;
- wherein the protrusion of the first member is interposed between the second member and the third member;
- wherein one of the second member and the third member has a concave surface to slidingly interface with the convex surface of the protrusion of the first member; and
- wherein the other of the second member and the third member has a convex surface to slidingly interface with the concave surface of the protrusion of the first member; and
- wherein one of the second member and third member is formed with at least one screw insertion hole extending therethrough; and
- wherein the other of the second member and the third member is formed with a fixing section adapted to be fixed to the mounting part and at least one screw hole adapted to be threadingly engaged with the mounting device; and
- wherein the protrusion of the first member can be fixed in position by tightening the mounting device; and
- wherein the mounting device is operated generally perpendicular to the pivot axis.

14. The fixture for the multiple-optical-axis photoelectric switch according to claim 13, wherein the protrusion of the first member further comprises:
- at least one guiding elongated hole adapted to slidingly interface with the mounting device.

15. The fixture for the multiple-optical-axis photoelectric switch according to claim 13, wherein the protrusion of the first member further comprises:
- at least one notch adapted to slidingly interface with the mounting device.

16. The fixture for the multiple-optical-axis photoelectric switch according to claim 13, further comprising:
- a recess formed in one of the second member and the third member and adapted to accommodate a signal cable drawn from the end of the main case.

17. The fixture for the multiple-optical-axis photoelectric switch according to claim 13, wherein:
- the second member is formed comprising the at least one screw insertion hole; and
- the third member is formed comprising:
  - the fixing section; and
  - the at least one screw hole; and
- the protrusion is formed so as to have as a center thereof an axis extending in the direction of alignment on a front surface of the main case toward which each element is directed.

18. A fixture for a multiple-optical-axis photoelectric switch according to claim 17, wherein:
- the mounting device is a mounting screw.

19. A mounting structure for a multiple-optical-axis photoelectric switch including a light emitter having at least one light emitting element and a light receiver having at least one light receiving elements corresponding to the light emitting elements, at least one of the light emitter and the light receiver including a main case, the mounting structure adapted to fix the case to a predetermined mounting part so as to allow the case to pivot about a pivot axis extending along a longitudinal direction of the case, the mounting structure comprising:
- a first member attached to a longitudinal end of the main case and having a protrusion extending in the direction of alignment;
- a second member adapted to slidingly engage the protrusion of the first member; and
- a third member adapted to slidingly engage the protrusion of the first member; and
- a mounting device,
- wherein the protrusion of the first member is interposed between the second member and the third member;
- wherein one of the second member and third member is formed with at least one screw insertion hole extending therethrough; and
- wherein the other of the second member and the third member is formed with a fixing section adapted to be fixed to the mounting part and at least one screw hole adapted to be threadingly engaged with the mounting device; and
- wherein the protrusion of the first member can be fixed in position by tightening the mounting device; and
- wherein the mounting device is operated generally perpendicular to the pivot axis.

20. A fixture for a multiple-optical-axis photoelectric switch including a light emitter having at least one light emitting element and a light receiver having at least one light receiving element corresponding to the tight emitting element, at least one of the light emitter and the light receiver including a main case, the fixture adapted to fix the multiple-optical-axis photoelectric switch to a predetermined mounting part so that the multiple-optical-axis photoelectric switch is capable of pivoting about a pivot axis extending along a longitudinal direction of the multiple-optical-axis photoelectric switch, the fixture comprising:
- a first member adapted to be fixed to a longitudinal end of the main case and having a protrusion extending in the direction of alignment comprising,
- a second member adapted to slidingly engage the protrusion of the first member; and
- a third member adapted to slidingly engage the protrusion of the first member; and
- a mounting device;
- wherein the protrusion of the first member is interposed between the second member and the third member;
- wherein one of the second member and third member is formed with at least one screw insertion hole extending therethrough; and
- wherein the other of the second member and the third member is formed with a fixing section adapted to be fixed to the mounting part and at least one screw hole adapted to be threadingly engaged with the mounting device; and
- wherein the protrusion of the first member can be fixed in position by tightening the mounting device; and
- wherein the mounting device is operated generally perpendicular to the pivot axis.

* * * * *